May 31, 1955 F. T. PAGE 2,709,746

PULSE GENERATOR

Filed Nov. 2, 1948 2 Sheets-Sheet 1

WITNESSES:

INVENTOR

Fountain T. Page.

BY

ATTORNEY

May 31, 1955 F. T. PAGE 2,709,746

PULSE GENERATOR

Filed Nov. 2, 1948 2 Sheets-Sheet 2

WITNESSES:
E. A. McCloskey
Wm. C. Groome

INVENTOR
Fountain T. Page.
BY F. E. Browder
ATTORNEY

United States Patent Office 2,709,746

Patented May 31, 1955

2,709,746

PULSE GENERATOR

Fountain T. Page, Baltimore, Md., assignor to Westinghouse Electric Corporation, East Pittsburgh, Pa., a corporation of Pennsylvania Application November 2, 1948, Serial No. 57,998

5 Claims. (Cl. 250—27)

This invention relates to pulse generators and more particularly to improved apparatus for the generation of rectangular pulses.

Electronic devices such as used for instance for radar, pulse communication and television utilize triggering devices to turn portions of such devices on and off for selected durations at selected rates.

The portion of the device so operated on is frequently a signal channel in the form of an electronic amplifier which is cut on or off by the application of pulses of voltage thereto. The signal channel may normally be inactive in which case a pulse is applied to activate it, or the channel may normally be alive in which case the pulse is applied to deactivate it for the duration of the pulse.

Those devices which include a channel which is normally disabled by the use of a high negative bias, or a deficient anode voltage require a positive pulse to activate the same. This process of applying a pulse to enable a signal channel to function is commonly termed "gating."

In order that the device shall function at a constant level during the selected period, the activating positive pulse applied thereto must have constant amplitude. Further, in order that the device shall be turned on and off in a precise manner, the gating pulse should have square corners, that is to say, it should have as instantaneous a growth and collapse as possible.

The device which generates controlling or gating pulses is herein termed a pulse generator.

It is frequently a further requirement that the pulse generator function to initiate a pulse in response to an impressed stimulus and that it supply a constant voltage for a duration which may be determined in itself or by a second impressed stimulus. For instance, in radar equipments, it is necessary to deactivate or desensitize the receiver during each duration of transmission in order to prevent blocking which would prevent the sensing of echoes. Therefore, immediately after the transmission pulse ceases, the receiver is gated on and remains sensitive for a selected period or until just before the next transmission. The pulse generator which supplies the gating potentials to the receiver is triggered into action by a triggering pulse derived from the transmitter. After the receiver is activated for an appropriate duration it must be permitted to resume the inactive state just before the emission of the next succeeding pulse of the transmitter. This objective is obtained by defining the duration of the gating pulse applied to the receiver either by the choice of circuit constants in the pulse generator or by a second triggering pulse applied to the gating pulse generator.

The gating pulse is therefore a unidirectional potential having a rapid rise to a selected value, followed by a constant value for a selected duration followed by a rapid decrease to the original value which may be zero.

Such a rectangular pulse may conveniently be obtained by turning on and off a constant current through a resistance. The desired rectangular gating pulses of voltage are thus developed and made available at the terminals of the resistance.

It follows that the development of such rectangular gating pulses necessitates a switching device which will turn on a pulse of current in response to a impressed stimulus and which will turn off the current either in response to a second impressed stimulus or by virtue of an internal timing arrangement.

It has been proposed in the prior art to arrange a grid controlled gas discharge tube or thyratron in series with a resistance and a source of constant potential so that the application of a triggering pulse to the grid instantaneously, or nearly so, causes the tube to conduct whereby a potential having a substantially instantaneous rise followed by a substantially constant value is created between the ends of the resistance.

It is well known that once a grid controlled gas discharge tube is rendered conducting the grid loses control. In order that the constant potential between the ends of the resistance be terminated so as to define the trailing edge of the pulse the current through the gas tube must be abruptly terminated. This objective can be obtained by removing the source of potential from the gas tube. One such arrangement in the prior art uses the stored charge in a capacitor for the aforesaid source of potential and by means of a second gas tube arranged in shunt therewith, discharges the capacitor at the appropriate time by the application of an igniting pulse to the grid of the second gas tube.

For purpose of convenience in the ensuing explanation, the first tube which switches on the current through the resistance is termed a switch tube, and the second tube which reduces the anode potential to cut-off the switch tube is called the cut-off tube.

In such devices of the prior art, such as shown for instance in Patent No. 2,428,149, the charge in a capacitor constitutes the entire anode potential for both the switch gas tube and the cut-off gas tube.

It is apparent that in a device wherein the switch tube and the cut-off tube have equal cathode-anode potentials there is no assurance that the switch tube will cut off first, and it follows that if the switch-tube does not cut off first that the generated pulse of potential will not have a straight line collapse to zero.

Another factor of importance in the use of grid controlled gas tubes for pulse generation is the necessity for rapid deionization of the tube so that the grid can regain control in an extremely short interim. I have found that the use of a voltage lower than the extinction value at the time of extinction is effective in obtaining this end. In pulse generators which have a very high repetition rate it is desirable to depress the anode voltage to a negative value to thereby materially shorten the deionization time.

My invention assures the attainment of an abrupt straight line termination of the generated pulse by so arranging the switch tube and cut-off tube that the cut-off tube remains conducting after the switch-tube is extinguished. In accordance with this arrangement the cut-off tube depresses the cathode-anode potential of the switch tube from its normal value to a value well below extinction at an extremely rapid rate.

It is therefore an object of this invention to provide a device for generating a potential having a rectangular wave form.

It is another object to provide a generator for the creation of pulses of direct current or direct potential having substantially vertical leading and trailing ends.

It is a further object of this invention to provide a pulse generator which responds instantly to an impressed triggering stimulus for delivering a current or voltage pulse.

It is another object of my invention to provide a pulse generator which will initiate a pulse immediately after the impressing thereon of one triggering stimulus, and which will terminate the pulse immediately on the impressing thereon of a second triggering stimulus.

It is another object of this invention to provide a pulse generator of rectangular wave forms which is adjustable as to duration of pulse.

It is a further object to disclose a generator of rectangular pulses which is adaptable to determine in itself the duration of the generated pulse.

It is an object of my invention to provide a pulse generator which is also useful for measuring the duration between impressed triggering pulses.

It is still another object to provide a generator for rectangular pulses which is simple, reliable and rugged in construction and is capable of a high repetition rate.

Other objects of the invention will become apparent from the following description taken in conjunction with the accompanying drawings in which Fig. 1 is a diagrammatic showing of one embodiment of my invention in which pulses are generated in accordance with successive impressed triggering pulses;

Like reference numerals in all figures refer to identical parts.

Figure 1:
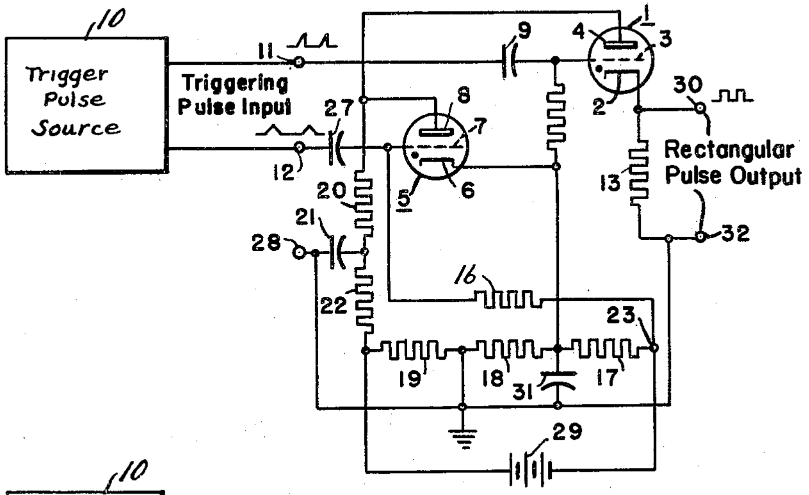

Referring to the drawings, Fig. 1, I show an embodiment of my improved pulse generator which is arranged to produce and to terminate a direct current or potential pulse in response to two successive impressed triggering pulses.

I accomplish my objectives with the use of a first grid controlled gas discharge tube 1 having a cathode 2, grid 3, and anode 4; and a second grid controlled gas discharge tube 5 having a cathode 6, control grid 7 and anode 8. These tubes may be any type of grid fired gas or vapor tube.

These tubes are arranged in a circuit so that tube 1 is caused to abruptly assume a conducting condition upon the impressing thereon of an external triggering pulse, and tube 5 is arranged to extinguish tube 1 after a duration of time as determined by the impression thereon of a second external triggering pulse. The triggering pulses may be derived from any suitable source, shown as a block 10, such as is well known in the art.

In order to permit the application of an external triggering pulse between the grid and cathode of tube 1, a pair of terminals 11 and 12 are provided. Terminal 11 is coupled to grid 3 through coupling capacitor 9. Terminal 28 is connected to cathode 2 through cathode resistor 13. The connection between input terminal 28 and cathode resistor 13 may be considered to be unipotential and for purposes of convenience it may be grounded and it is so shown.

To the end that tube 1 will be ready to conduct upon the application of a triggering pulse to its grid a source of substantially constant potential is impressed across the cathode-anode interelectrode space. This potential is made available by a stored charge in capacitor 21.

The manner in which capacitor 21 is charged is as follows. A voltage divider comprising resistors 17, 18 and 19 is impressed with a substantially constant potential source 29 having the polarity as indicated by the + and − signs. The junction of resistors 18 and 19 is connected to one terminal of capacitor 21 and also to ground.

The second terminal of capacitor 21 is connected to the positive terminal of the source of potential through resistance 22. Resistance 22 has a selected value such that the charging time of capacitor 21 is less than the desired quiescent period between the output pulses to be generated.

The potential due to the stored energy in capacitor 21 is applied between the anode and cathode of tube 1 through resistances 20 and 13 respectively. The potential which is applied between the anode and cathode of tube 1 is, under static conditions, equal to the IR drop through resistor 19.

The gas switch tube 1 is further arranged for reliable operation and prevented from firing prematurely by the imposition on its grid of a negative bias as derived from the junction of resistors 17 and 18.

From the foregoing it is seen that conduction of tube 1 can be initiated abruptly by the application of a sufficiently positive triggering pulse to its grid. The value of cathode resistance 13 together with resistance 20 is such as to permit the charge in capacitor 21 to be dissipated only over a period of time which is long compared to the duration of a generated pulse. The rate of decay of potential across capacitor 21 for an assumed short period of conduction is therefore negligible.

Figure 5:
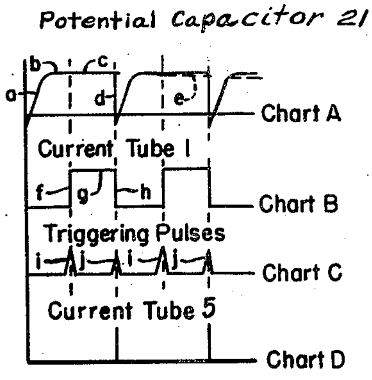
Fig. 5 is a chart useful in explaining the operation of the embodiments of the other figures.

Referring to Fig. 5 of the drawings, the potential across capacitor 21 is shown by chart A. Assuming a generated pulse has just been terminated, the potential across the capacitor 21 rises sharply along line *a* to the terminal value *b* and remains constant. When switch tube 1 is triggered-on, the potential has a decay rate as shown by the dotted line *e*. Therefore, during the duration of the pulse *c* the capacitor potential may be considered substantially constant. The rise of current through resistance 13 and therefore the potential across it is as shown in Fig. 5, chart B, line *f*. This is the leading edge of the generated pulse.

The means by which the passage of current through tube 1 and pulse potential developing resistance 13 is terminated will now be described.

The conductivity of gas tube 1 can be terminated or cut-off by the reduction of the interelectrode cathode-anode potential to a value below that required to sustain ionization. To this end I provide a second grid controlled gas discharge tube 5. The anode of tube 5 is connected to the anode of tube 1. The cathode of tube 5 is connected to a point of negative potential on the voltage divider at the junction of resistors 17 and 18. It is important to note that the cathode of cut-off tube 5 is negative with respect to the cathode of tube 1. The importance of this arrangement will presently become apparent.

The anode of tube 5 is connected in parallel with the anode of tube 1 to one terminal of capacitor 21 through resistor 20. The cathode-anode potential of tube 5 is therefore the potential across capacitor 21 plus the potential across relatively large capacitor 31.

Cut-off tube 5 is prevented from firing prematurely by the connection of its grid through resistance 16 to point 23 on the voltage divider which is negative with respect to its cathode.

Assuming tube 1 is conducting and after the desired pulse duration a positive triggering pulse is applied to the igniting electrode of tube 5, and tube 5 assumes a conducting condition. It was previously mentioned that the anode-cathode potential of tube 1 is equal to the potential across capacitor 21 whereas the anode-cathode potential of tube 5 consists of the sum of the potential across capacitor 21 and the IR drop across resistor 18 which is also the value of the sum of the potential across capacitor 21 and the potential across capacitor 31.

It follows that tube 5 will be definitely conductive after tube 1 is extinguished or cut off. In fact, the anode of tube 1 is abruptly driven negative with respect to its cathode so that the conduction of current through resistor 13 is cut off very decisively, and the deionization time of the tube is so shortened that the grid regains control in extremely short order.

Tube 5 stops conducting as soon as the algebraic sum of the potentials across capacitors 31 and 21 reaches the extinction value. The resistances 17, 20 and 22 in series with the source of potential 29 prevent the application of a direct sustaining voltage to tube 5.

The presence and action of resistor 20 is particularly important in the extinction process of tube 1. With the use of resistor 20, the potential across capacitor 21 at the exact instant tube 5 fires, starts to decay but at the same instant the voltage on anodes 8 and 4 has lowered to a value determined by the voltage divider action of resistor 20 and the impedance of tube 5. Since resistor 20 is many times as great as the impedance of tube 5, the anodes are reduced to very nearly the potential of capacitor 31.

The current in tube 1 and therefore the potential across resistance 13 drops to zero almost instantaneously as indicated in Fig. 5, chart B, line *h*.

A résumé of the operation of the foregoing embodiment is as follows. Capacitor 21 is fully charged. A positive triggering pulse shown at *i* in chart C of Fig. 5 is applied through terminal 11 to the grid of switch tube 1. Tube 1 instantly conducts and the almost instantaneous presence of current in resistance 13 results in a vertical leading edge of a pulse as shown in Fig. 5, chart B, line *f*. Tube 1 is permitted to conduct for a selected period thereby presenting a substantially constant potential across resistance 13, as shown in Fig. 5, chart B, line *g*. Then, at the instant the pulse is to be terminated, a second input trigger pulse *j* is applied to the grid of cut-off tube 5. This tube drives the anode potential of tube 1 well down below the conduction sustaining point to a negative value to thereby give a vertical cut-off trailing edge to the pulse as shown in Fig. 5, chart B, line *h*.

It is sometimes desirable that a pulse generator be provided with the means whereby the pulse duration is determined by internal arrangements which are preferably adjustable.

From the foregoing explanation of the embodiment of Fig. 1, it is understood that the duration of the pulse is dependent on the instant that tube 5 is rendered conducting.

Figure 2:
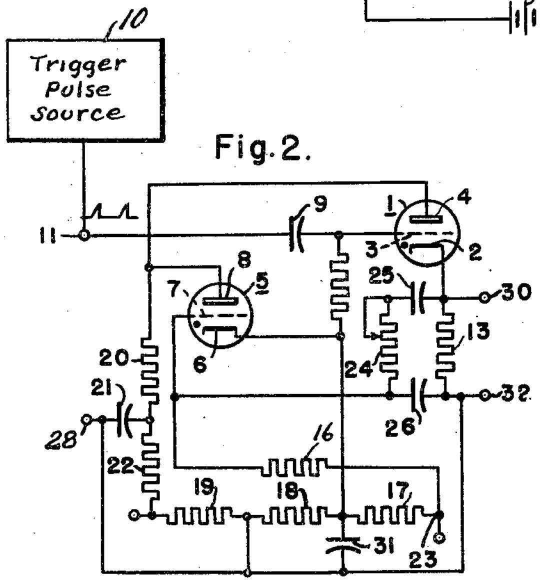
Fig. 2 is a modification in which pulses are generated in accordance with externally impressed triggering pulses and internally generating terminating triggering pulses.

To the end that the instant of conduction of tube 5 can be determined after a precise lapse of time after the firing of tube 1, I have arranged the embodiment of Fig. 2 so that the application of a trigger pulse to grid 7 of tube 5 is a function of time measured from the instant of conduction of tube 1.

To this end I couple the grid of tube 5 to the cathode of tube 1 by series connected resistances 24 and condenser 25. Resistance 24 and condenser 25 taken with capacitor 26 constitute a network having such selected values that the grid of tube 5 reaches a positive firing potential at a definite selected interval after the cathode 2 of tube 1 rises sharply to a positive value as a result of the IR drop across resistance 13. It is observed that pulse output terminals 30 and 32 are connected across the resistor 13.

This effect is obtained as follows. When tube 1 suddenly becomes conducting, a steep front pulse of potential is created across cathode resistor 13. This potential is impressed across capacitor 25, resistance 24 and capacitance 26 all in series. The potential across capacitor 26 builds up at a rate determined by the value of resistance 24. When it reaches igniting potential, tube 5 is abruptly rendered conducting and as previously explained, instantaneously depresses the anode potential on tube 1 to a value well below extinction thereby instantly extinguishing the tube and terminating the generated pulse.

In order that tube 1 is again readied to conduct upon the occurrence of a triggering pulse, tube 5 is extinguished in a very short time after extinguishing tube 1 in the manner previously explained with reference to the embodiment of Fig. 1.

Tube 1 is again readied for firing by recharging of capacitor 21 through resistors 20 and 22 to provide the steady state anode potential previously discussed.

Provision is made for adjusting the length of generated pulse by means of adjustability in resistance 24.

The adaptability of the pulse generator of this disclosure to terminate the generated pulse either by a second externally impressed trigger pulse in accordance with Fig. 1 or by an internally generated trigger pulse which occurs an adjustable period of time after the initiation of the generated pulse in accordance with Fig. 2 renders the device useful as a measuring device for the interval between received pulses.

Figure 3:
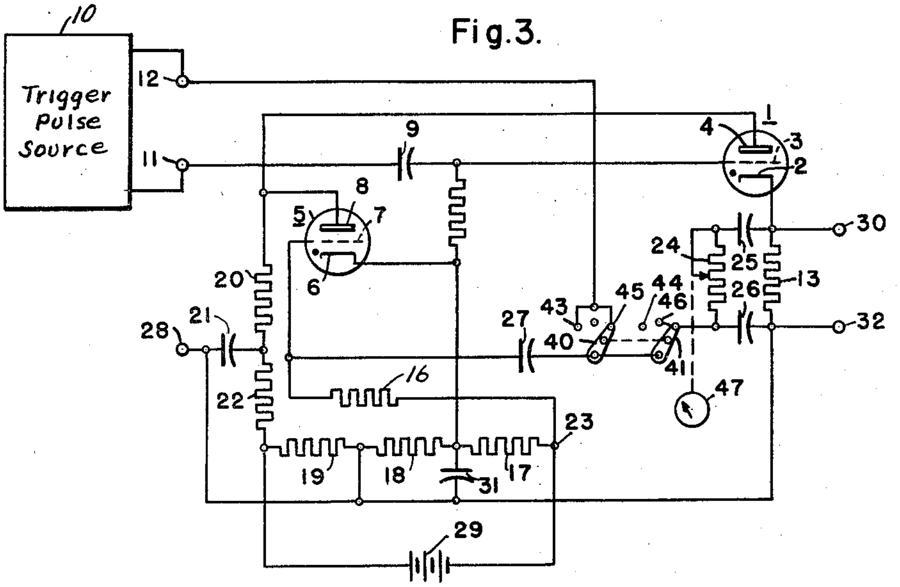
Fig. 3 is a further modification in which the device includes the characteristics of the embodiments of Figs. 1 and 2 and in addition is adapted to measure pulse repetition rate.

Referring to Fig. 3, the embodiments of Figs. 1 and 2 are combined in a versatile arrangement by the provision of switches 40 and 41. These switches are each single pole triple throw and are ganged for simultaneous positioning as indicated by the conventional dot-dash line. In the extreme counterclockwise position such as on contact 43 of switch 40 the generated pulse is terminated only by externally received triggering pulse. In the middle position, such as contact 46 of switch 41, the device terminates its generated pulse in accordance with the setting of resistance 24. Resistance 24 is provided with a dial 47 which is calibrated to read the time lapse between the creation and termination of the generated pulse.

In the extreme clockwise position of the switch a terminating external pulse is applied to tube 5 by means of contact 45 of switch 40 and the internally generated triggering pulse is applied to tube 5 through contact 46 of switch 41. The generated output pulse is therefore terminated by either the external trigger pulse or the internally generated trigger pulse whichever occurs first. It follows that if resistance 24 is initially set for a very short generated output pulse and is gradually adjusted to lengthen the pulse, that position at which the pulse assumes a constant length is the setting at which the receipt of the external terminating trigger pulse and the occurrence of the internally generated terminating trigger pulse is the same. Therefore, the reading of dial 47 indicates the lapse of time between the successively received initiating and terminating trigger pulses.

The calibration of the embodiment of Figure 3 is dependent on the impedance of the external trigger pulse source as a result of the circuit relationship of the internal and external trigger pulse sources. Referring to Figure 3, it is seen that in the pulse rate measuring position which is the extreme clockwise position of switches 40 and 41, capacitor 26 is effectively in series with the trigger pulse source applied to terminal 12. It follows that the trigger pulse entering terminal 12 is delayed by a time interval determined by the values of capacitor 26 and the impedance of the external trigger source. To the end that the delay be maintained at a low value, it is necessary that the trigger source impedance be selected to have a low value . This expedient affects the time of firing of tube 5 due to the internally generated pulse for the reason that a low external trigger source impedance causes a division of the charging current into capacitor 26 and thereby effects a decreased growth of potential. To the end that the response to either pulse source shall be independent of the other pulse source, I provide the embodiment of Figure 4 in which the two trigger pulse sources are isolated from each other.

Figure 4:
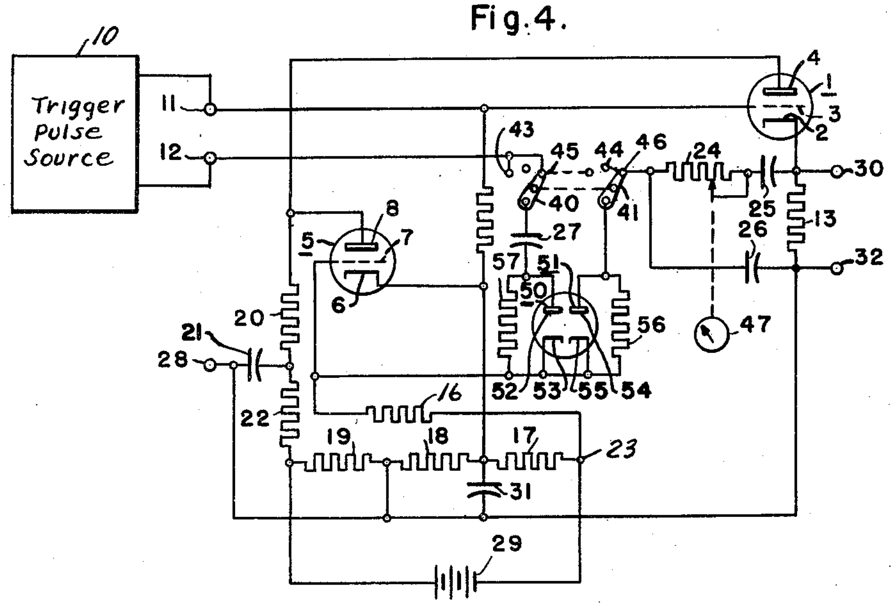
Fig. 4 is an embodiment similar to Fig. 3 and provided with certain improvements.

Referring now to Figure 4, I isolate the external trigger pulse terminal 12 from the internally generated pulse circuit by a pair of back-to-back rectifiers 50 and 51. These rectifiers may be of any known type although for purposes of clarity I show them as thermionic diodes. Each of the rectifiers has an anode and a cathode indicated by the numerals 52, 53 and 54, 55 respectively. The cathodes are joined by a common connection with the control electrode of tube 5. The anode 52 of diode 50 is coupled to the external trigger pulse source at terminal 12 by capacitor 27 and switch 40. The anode 54 of tube 51 is coupled to the internal pulse generating network via switch 41.

Accordingly, a positive pulse derived from the external source through terminal 12 and applied to anode 52 of diode 50 through coupling capacitor 27, causes a sudden emission of electrons from cathode 53 thereby impressing a positive firing pulse on grid 7 of tube 5. This operation is independent of the internal trigger pulse network due to the blocking effect of diode 51 in which the anode 54 is negative with respect to the momentarily positive cathode 55.

For the triggering operation of tube 5 due to an internal pulse, anode 54 is impressed with a positive pulse derived from network 13, 24, 25 and 26, thereby generating a positive pulse on cathodes 55 and 53 of tubes 51 and 50 and grid 7 of cut-off tube 5, respectively. Cathode 53 of diode 50 now being positive blocks diode 50 thereby isolating the external pulse source connected to terminal 12 from the internal trigger pulse circuit.

Diodes 50 and 51 are conditioned for repeated operations by resistors 56 and 57 respectively, which act to drain off the charges on the anodes in time for operation on succeeding pulses.

Although the invention has been described with reference to the above described specific embodiments, other modifications are possible. Therefore, the invention is restricted only by the appended claims as interpreted in view of the prior art.

I claim as my invention:

1. In a system for generating rectangular pulses of voltage, a first gaseous discharge device having at least a cathode, a control grid and an an anode; a second gaseous discharge device having at least a cathode, a control grid and an anode, a source of positive potential, a point of neutral potential, a first source of negative potential and a second source of negative potential more negative than the said first source of negative potential, a first energy storing capacitor connected between said source of positive potential and said neutral point, a resistor for connecting the anodes of said discharge devices to the positive potential terminal of said first capacitor, a second energy storing capacitor connected between said first source of negative potential and said neutral point, means for connecting the cathode and control grid of the first discharge device to the neutral point and first negative source of potential respectively, means for connecting the cathode and grid of said second discharge device to said first negative source and said second source of negative potential respectively, means for applying a first positive triggering pulse to the grid of the first discharge device and means for applying a second positive triggering pulse to the grid of the second discharge device, whereby the application of a first triggering pulse causes the first discharge device to become conductive, and the application of the said second triggering to the second discharge device causes it to become conductive to thereby substantially discharge the said first capacitor and reverse the polarity of potential applied to the anode of the first device to thereby effect the rapid deionization thereof and permit the grid to regain control.

2. In a pulse generator, a first source of potential, a resistance and a grid controlled gaseous discharge device, means for connecting the gaseous discharge device and resistance in series with said source of potential, means for applying an input triggering pulse to the grid of said gaseous discharge device to thereby create a substantially instantaneous rise of voltage to a constant value across said resistance, a second grid controlled gaseous discharge device, and a second source of potential larger than the first mentioned potential connected in series with said second gaseous discharge device, said serially connected second gaseous discharge tube and second source of potential being connected in shunt substantially with said first source of potential, delay network means comprising an adjustable resistance connected to the first mentioned resistance to thereby derive from the instantaneous rise of voltage across the same an adjustably delayed triggering pulse; and switch means to provide the selective application of an external terminating trigger pulse, the internally derived delayed terminating triggering pulse or both said terminating triggering pulses to the grid of the second gaseous discharge device to render the same conducting to thereby connect the second source of potential in series with the first source of potential to thereby rapidly discharge the same, reverse its polarity and substantially instantaneously extinguish the current through the said first mentioned resistance to terminate the generated pulse.

3. In a pulse generating device, a first gaseous discharge device, and a second gaseous discharge device, said first gaseous discharge device connected in series with a resistance and a first voltage source, said second gaseous discharge tube being connected in shunt with said first voltage source, means for impressing an externally derived initiating triggering pulse on said first gaseous discharge device to render the same conducting and thereby pass a current through the said resistance to produce a sharp rise of voltage thereacross, means for impressing an externally derived terminating trigger pulse on said second gaseous discharge device to discharge said first voltage source and extinguish the first gaseous discharge device; an adjustable delay network, means for impressing an internally generated second terminating trigger pulse from said sharp rise of voltage across said resistance on said second gaseous discharge device, means for isolating the said means for impressing an externally derived terminating trigger pulse on said second gaseous discharge device and said adjustable delay network from each other, and calibrated time lapse indicating means connected to said adjustable delay network whereby adjustment of the delay means to provide coincidence between the externally derived terminating trigger pulse and the internally generated terminated trigger pulse is a measure of the duration between the externally derived initiating trigger pulse and the externally derived terminating trigger pulse.

4. In a pulse generator and measuring device, a first source of potential, a resistance, and a first thyratron, means for connecting the thyratron and resistance in series with said source of potential, means for applying an input triggering pulse to the grid of said first thyratron to thereby create a substantially instantaneous rise of voltage to a constant value across said resistance, a second thyratron and a second source of potential larger than the first mentioned potential connected in series with said second thyratron, said serially connected second thyratron and second source of potential being connected in shunt substantially with said first source of potential, delay network means comprising a serially connected capacitor and an adjustable resistance connected in shunt with said first mentioned resistance to thereby derive from the spontaneous rise of voltage across the first mentioned resistance an adjustably delayed triggering pulse; switch means to provide the selective application of an external terminating trigger pulse solely, the internally derived delayed terminating trigger pulse solely or both said terminating trigger pulses to the grid of the second thyratron to render the same conducting to thereby connect the second source of potential in series with the first source of potential to abruptly discharge the same and reverse its polarity, to thereby extinguish the current through the first mentioned resistance to terminate the pulse; and a first rectifier means in the external derived terminating trigger pulse circuit and a second rectifier means in the internally derived terminating trigger pulse circuit, said rectifiers having a common connection in back-to-back relation for coupling said terminating trigger pulse circuits to the grid of said second thyratron to thereby isolate the said pulse circuits from each other.

5. The combination comprising a first gaseous electric discharge device having an anode and a cathode, a source of anode-cathode potential for said discharge device comprising a first capacitor, a resistor connected between the anode of said discharge device and said capacitor, a second gaseous electric discharge device having an anode, a cathode, and a control electrode, a second capacitor, means connecting said anodes together, means connecting said second discharge device in series with said second capacitor across the serial combination of said resistor and first capacitor, means for charging said first capacitor to cause positive potential to be applied to said anodes, means for charging said second capacitor to cause the cathode of said second discharge device to be negative with respect to the cathode of said first discharge device, means for rendering said first discharge device conductive, and means for thereafter rendering said second discharge device conductive, whereby upon conduction of said second discharge device the anode potential of said first discharge device will be substantially instantaneously depressed to a magnitude negative with respect to its cathode to cause rapid deionization of said first discharge device.

References Cited in the file of this patent

UNITED STATES PATENTS

| | | |
|---|---|---|
| 1,691,395 | Langmuir | Nov. 13, 1928 |
| 1,834,889 | Bedford | Dec. 1, 1931 |
| 2,063,025 | Blumlein | Dec. 8, 1936 |
| 2,105,902 | Cawein | Jan. 18, 1938 |
| 2,221,569 | Berkey et al. | Nov. 12, 1940 |
| 2,280,949 | Hall | Apr. 28, 1942 |
| 2,340,077 | Pearson et al. | Jan. 25, 1944 |
| 2,372,106 | Nagel | Mar. 20, 1945 |
| 2,401,657 | Mumma | June 4, 1946 |
| 2,428,149 | Falk | Sept. 30, 1947 |
| 2,435,751 | Morrison | Feb. 10, 1948 |
| 2,473,432 | Johnston | June 14, 1949 |
| 2,519,413 | Taylor | Aug. 22, 1950 |
| 2,573,558 | Fischman | Oct. 30, 1951 |